United States Patent
Van Cleve et al.

(10) Patent No.: US 8,448,491 B2
(45) Date of Patent: May 28, 2013

(54) VIBRATORY FLOW METER AND METHOD FOR CORRECTING FOR AN ENTRAINED PHASE IN A TWO-PHASE FLOW OF A FLOW MATERIAL

(75) Inventors: Craig Brainerd Van Cleve, Lyons, CO (US); Joel Weinstein, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 677 days.

(21) Appl. No.: 12/596,591

(22) PCT Filed: May 3, 2007

(86) PCT No.: PCT/US2007/068187
§ 371 (c)(1),
(2), (4) Date: Oct. 19, 2009

(87) PCT Pub. No.: WO2008/136825
PCT Pub. Date: Nov. 13, 2008

(65) Prior Publication Data
US 2010/0170322 A1    Jul. 8, 2010

(51) Int. Cl.
*G01F 25/00*    (2006.01)
(52) U.S. Cl.
USPC .............. 73/1.16; 73/861.356; 73/861.357; 702/54
(58) Field of Classification Search
USPC .................. 73/1.16, 861.357, 861.356
See application file for complete search history.

(56) References Cited

U.S. PATENT DOCUMENTS

| | | | | |
|---|---|---|---|---|
| 5,594,180 A | * | 1/1997 | Carpenter et al. | 73/861.356 |
| 5,687,100 A | * | 11/1997 | Buttler et al. | 702/137 |
| 6,230,104 B1 | * | 5/2001 | Shelley et al. | 702/56 |
| 6,327,914 B1 | * | 12/2001 | Dutton | 73/861.356 |
| 6,556,931 B1 | * | 4/2003 | Hays et al. | 702/54 |
| 7,305,892 B2 | | 12/2007 | Kourosh | |
| 7,421,350 B2 | * | 9/2008 | Duffill et al. | 702/50 |
| 2002/0033043 A1 | | 3/2002 | Dutton et al. | |
| 2003/0154804 A1 | * | 8/2003 | Henry et al. | 73/861.356 |
| 2004/0123645 A1 | | 7/2004 | Storm, Jr. et al. | |
| 2006/0272428 A1 | | 12/2006 | Rieder et al. | |

FOREIGN PATENT DOCUMENTS

| | | |
|---|---|---|
| EP | 1693654 A2 | 8/2006 |
| GB | 1138433 | 1/1969 |
| KR | 20020063446 | 8/2002 |
| RU | 2164009 C2 | 10/2001 |
| WO | 9605484 A1 | 2/1996 |
| WO | WO-2005-010470 A2 | 2/2005 |

* cited by examiner

*Primary Examiner* — Hezron E Williams
*Assistant Examiner* — Mark A Shabman
(74) *Attorney, Agent, or Firm* — The Ollila Law Group LLC

(57) ABSTRACT

A vibratory flow meter (100) for correcting for an entrained phase in a two-phase flow of a flow material is provided. The vibratory flow meter (100) includes a flow meter assembly (10) including a driver (104) and with the vibratory flow meter (100) being configured to generate a vibrational response for the flow material. The vibratory flow meter (100) further includes and meter electronics (20) coupled to the flow meter assembly (10) and receiving the vibrational response. The meter electronics (20) is configured to generate a measured two-phase density of the two-phase flow using the vibrational response, determine the computed drive power needed by a driver (104) of the flow meter assembly (10), and calculate a density compensation factor using a liquid density of a liquid component of the two-phase flow, an entrained phase density of an entrained phase component, the measured two-phase density, and the computed drive power.

44 Claims, 5 Drawing Sheets

VIBRATORY FLOW METER AND METHOD FOR CORRECTING FOR AN ENTRAINED PHASE IN A TWO-PHASE FLOW OF A FLOW MATERIAL

BACKGROUND OF THE INVENTION

1. Field of the Invention

The present invention relates to a vibratory flow meter and method, and more particularly, to a vibratory flow meter and method for correcting for an entrained phase in a two-phase flow of a flow material.

2. Statement of the Problem

Vibrating conduit sensors, such as Coriolis mass flow meters and vibrating densitometers, typically operate by detecting motion of a vibrating conduit that contains a flowing material. Properties associated with the material in the conduit, such as mass flow, density and the like, can be determined by processing measurement signals received from motion transducers associated with the conduit. The vibration modes of the vibrating material-filled system generally are affected by the combined mass, stiffness and damping characteristics of the containing conduit and the material contained therein.

A typical Coriolis mass flow meter includes one or more conduits that are connected inline in a pipeline or other transport system and convey material, e.g., fluids, slurries, emulsions, and the like, in the system. Each conduit may be viewed as having a set of natural vibration modes, including for example, simple bending, torsional, radial, and coupled modes. In a typical Coriolis mass flow measurement application, a conduit is excited in one or more vibration modes as a material flows through the conduit, and motion of the conduit is measured at points spaced along the conduit. Excitation is typically provided by an actuator, e.g., an electromechanical device, such as a voice coil-type driver, that perturbs the conduit in a periodic fashion. Mass flow rate may be determined by measuring time delay or phase differences between motions at the transducer locations. Two such transducers (or pickoff sensors) are typically employed in order to measure a vibrational response of the flow conduit or conduits, and are typically located at positions upstream and downstream of the actuator. The two pickoff sensors are connected to electronic instrumentation by cabling, such as by two independent pairs of wires. The instrumentation receives signals from the two pickoff sensors and processes the signals in order to derive a mass flow rate measurement.

Flow meters are used to perform mass flow rate measurements for a wide variety of fluid flows. One area in which Coriolis flow meters can potentially be used is in the metering of oil and gas wells. The product of such wells can comprise a multiphase flow, including the oil or gas, but also including other components, including water and air, for example, and/or solids. It is highly desirable that the resulting metering be as accurate as possible, even for such multiphase flows.

Coriolis meters offer high accuracy for single phase flows. However, when a Coriolis flow meter is used to measure aerated fluids or fluids including entrained gas (emulsions), the accuracy of the meter can be significantly degraded. This is similarly true for entrained solids (slurries).

Entrained air is commonly present as bubbles in the flow material. The size of the bubbles can vary, depending on the amount of air present, the pressure of the flow material, and the temperature. The extent of the decrease in performance is not only related to how much total gas is present, but also to the size of the individual gas bubbles in the flow. The size of the bubbles affects the accuracy of the measurement.

One significant source of error is fluid decoupling. Fluid decoupling results from the motion of the gas bubbles with respect to the liquid as a result of the vibration of the tube. The relative motion of the gas bubbles with respect to the liquid is driven by a buoyant force that is similar to the force that causes bubbles to rise to the surface under the influence of gravity. However, in a vibrating tube, it is the acceleration of the vibrating tube that causes the bubbles to move and not the acceleration of gravity. Because the dense fluid resists the acceleration more strongly than the light bubbles, the bubbles are accelerated in the same direction as the tube acceleration. The bubbles thus move faster and further than the flow tube and the bubble motion causes some of the fluid to move more slowly than the flow tube. This is the basis of the decoupling problem. As a result, the fluid that has the lower vibrational amplitude undergoes less Coriolis acceleration and imparts less Coriolis force on the flow tube than it would in the absence of bubbles. This results in the flow rate and density characteristics being under-reported (negative flow and density errors) when entrained air is present.

Slurries present a problem similar to decoupling. In the case of slurries, however, the solid particles are often heavier than the liquid. Under the acceleration of the vibrating tube, the heavier particles move less than the liquid. This causes some of the liquid to move more than the vibrating tube. The result is that the liquid is over-reported (positive flow and density errors) when particles heavier than the liquid are present. In both cases, the entrained phase's differential motion is driven by the difference in density between the entrained phase and the liquid. If the compressibility of gasses is neglected, then the same equations can be used to describe the behavior of both entrained air and particles. Subtracting the entrained phase density from the liquid density gives positive numbers for gasses and negative numbers for solids. The decoupling of slurries is simply negative. For this reason the term decoupling will be used interchangeably for both emulsions and slurries.

Compensating for fluid decoupling has been difficult because there are several factors that determine how much the bubbles move with respect to the fluid. Fluid viscosity is an obvious factor. In a very viscous fluid, bubbles (or particles) are effectively frozen in place in the fluid and little flow error results.

Another influence on bubble mobility is the bubble size. The drag on a bubble is proportional to the surface area, whereas the buoyant force is proportional to the volume. Therefore, very small bubbles have a high drag to buoyancy ratio and tend to move with the fluid. Small bubbles subsequently cause small errors. Conversely, large bubbles tend not to move with the fluid and result in large errors. The same holds true for particles. Small particles tend to move with the fluid and cause small errors.

The density difference between the fluid and the gas is another factor. The buoyant force is proportional to the difference in density between the fluid and the gas. A high pressure gas can have a high enough density to affect the buoyant force and reduce the decoupling effect. In addition, large bubbles occupy more volume, leading to true fluctuations in the density of the flow material. Due to the compressibility of a gas, the bubbles can change in gas quantity and yet not necessarily change in size. Conversely, if the pressure changes, the bubble size can correspondingly change, expanding as the pressure drops or shrinking as the pressure increases. This can also cause variations in the natural or resonant frequency of the flow meter and thus variations in the actual two-phase density.

Second order factors also can have an effect on bubble and particle mobility. The turbulence in a high flow rate fluid breaks large bubbles and particles into smaller ones, thus reducing decoupling error. Surfactants reduce the surface tension of bubbles and decrease their tendency to coalesce. Valves can decrease bubble size through increased turbulence while pipeline elbows can increase bubble size by forcing them together through centrifugal force.

There remains a need in the art for a vibratory flow meter that detects problematic levels of entrained second-phase materials. There remains a need in the art for a vibratory flow meter that can accurately measure flow characteristics in the presence of entrained second-phase materials. There remains a need in the art for a vibratory flow meter that can accurately measure flow characteristics at varying levels of entrained second-phase materials.

SUMMARY OF THE INVENTION

A vibratory flow meter for correcting for an entrained phase in a two-phase flow of a flow material is provided according to an embodiment of the invention. The vibratory flow meter comprises a flow meter assembly including a driver and with the vibratory flow meter being configured to generate a vibrational response for the flow material. The vibratory flow meter further comprises meter electronics coupled to the flow meter assembly and receiving the vibrational response. The meter electronics is configured to generate a measured two-phase density of the two-phase flow using the vibrational response, determine the computed drive power being consumed by a driver of the flow meter assembly, and calculate a density compensation factor using a liquid density of a liquid component of the two-phase flow, an entrained phase density of an entrained component, the measured two-phase density, and the computed drive power.

A method of correcting for an entrained phase in a two-phase flow of a flow material in a vibratory flow meter is provided according to an embodiment of the invention. The method comprises generating a measured two-phase density of the two-phase flow, determining a computed drive power being consumed by a driver of the vibratory flow meter, and calculating a density compensation factor using a liquid density of a liquid component of the two-phase flow, an entrained phase density of an entrained component, the measured two-phase density, and the computed drive power.

A method of correcting for an entrained phase in a two-phase flow of a flow material in a vibratory flow meter is provided according to an embodiment of the invention. The method comprises generating a measured two-phase density of the two-phase flow, determining the computed drive power being consumed by a driver of the vibratory flow meter, calculating a density compensation factor using a liquid density of a liquid component of the two-phase flow, an entrained phase density of an entrained component, the measured two-phase density, and the computed drive power, and adding the density compensation factor to the measured two-phase density to provide a compensated two-phase density. The method further comprises determining a predicted drive power using the liquid density, the entrained phase density of the entrained component, the compensated two-phase density, and a power characteristic of the vibratory flow meter. The method further comprises determining an accuracy of flow measurements of the vibratory flow meter based on a difference between the predicted drive power value and the computed drive power.

ASPECTS OF THE INVENTION

In one aspect of the vibratory flow meter, the meter electronics are configured to multiply a drive voltage by a drive current in order to determine the computed drive power.

In another aspect of the vibratory flow meter, the meter electronics are configured to multiply a pickoff sensor voltage by a drive current in order to determine the computed drive power.

In yet another aspect of the vibratory flow meter, the meter electronics are configured to solve equation $$P_{computed} = K \times \left[ (I_d \times E_{PO}) \times \left(\frac{E_t}{E_{PO}}\right)^2 - (I_0 \times E_t) \right]$$

in order to determine the computed drive power, where K is a proportionality constant, $I_d$ is a measured drive current, $I_0$ is a zero volume fraction drive current, $E_{PO}$ is a pickoff voltage, and $E_t$ is a pickoff target voltage.

In yet another aspect of the vibratory flow meter, calculating the density compensation factor comprises solving equation $$\left(\frac{\rho_l - \rho_{uut}}{\rho_l - \rho_e}\right)^{C1} \times C2(P_{computed}),$$

with ($\rho_l$) being the liquid density, with ($\rho_{uut}$) being the indicated density, with ($\rho_e$) being the entrained phase density, with ($P_{computed}$) being the computed drive power, and with the C1 and C2 terms comprising predetermined meter-specific constants.

In yet another aspect of the vibratory flow meter, the meter electronics are further configured to add the density compensation factor to the measured two-phase density to provide a compensated two-phase density.

In yet another aspect of the vibratory flow meter, the meter electronics are further configured to add the density compensation factor to the measured two-phase density to provide a compensated two-phase density, determine a predicted drive power using the liquid density, the entrained phase density, the compensated two-phase density, and a power characteristic of the vibratory flow meter, and determine an accuracy of flow measurements of the vibratory flow meter based on a difference between the predicted drive power value and the computed drive power.

In yet another aspect of the vibratory flow meter, with the meter electronics being further configured to solve the equation, $$\left(\frac{\rho_l - \rho_{comp}}{\rho_l - \rho_e}\right)$$

where $\rho_{comp}$ is the compensated two-phase density, to obtain a compensated volume fraction for the two-phase flow.

In yet another aspect of the vibratory flow meter, determining the accuracy further comprises generating an alarm indication if the computed drive power differs from the predicted drive power by more than a predetermined tolerance.

In yet another aspect of the vibratory flow meter, determining the accuracy further comprises generating an alarm indication if the computed drive power is greater than the predicted drive power by more than a predetermined upper threshold, indicating an excessive entrained phase level and further indicating a needed change in flow conditions in the vibratory flow meter.

In yet another aspect of the vibratory flow meter, determining the accuracy further comprises generating an alarm indication if the computed drive power is greater than the predicted drive power by more than a predetermined upper threshold, indicating an excessive gas bubble size and further indicating a needed change in flow conditions in the vibratory flow meter.

In yet another aspect of the vibratory flow meter, determining the accuracy further comprises generating an alarm indication if the computed drive power is greater than the predicted drive power by more than a predetermined upper threshold, indicating an excessive solid entrained phase level and further indicating a needed change in flow conditions in the vibratory flow meter.

In yet another aspect of the vibratory flow meter, determining the accuracy further comprises generating an alarm indication if the computed drive power is greater than the predicted drive power by more than a predetermined upper threshold.

In yet another aspect of the vibratory flow meter, determining the accuracy further comprises refining the compensated two-phase density if the computed drive power is less than the predicted drive power by more than a predetermined lower threshold or if the computed drive power is greater than the predicted drive power by more than a predetermined upper threshold.

In yet another aspect of the vibratory flow meter, refining the compensated two-phase density comprises reducing the density compensation factor by an amount proportional to a difference between the computed drive power and the predetermined lower threshold.

In yet another aspect of the vibratory flow meter, determining the accuracy further comprises comparing the predicted drive power to the computed drive power, generating an alarm indication if the computed drive power is greater than the predicted drive power by more than a predetermined upper threshold, and refining the compensated two-phase density by reducing the density compensation factor by an amount proportional to a difference between the computed drive power and the predetermined lower threshold if the computed drive power is less than the predicted drive power by more than a predetermined lower threshold.

In one aspect of the method, determining the computed drive power comprises multiplying a drive voltage by a drive current.

In another aspect of the method, determining the computed drive power comprises multiplying a pickoff sensor voltage by a drive current.

In yet another aspect of the method, determining the computed drive power comprises solving equation $$P_{computed} = K \times \left[ (I_d \times E_{PO}) \times \left(\frac{E_t}{E_{PO}}\right)^2 - (I_0 \times E_t) \right],$$

where K is a proportionality constant, $I_d$ is a measured drive current, $I_0$ is a zero volume fraction drive current, $E_{PO}$ is a pickoff voltage, and $E_t$ is a pickoff target voltage.

In yet another aspect of the method, calculating the density compensation factor comprises solving equation, $$\left(\frac{\rho_l - \rho_{uut}}{\rho_l - \rho_e}\right)^{C1} \times C2(P_{computed})$$

with ($\rho_l$) being the liquid density, with ($\rho_{uut}$) being the indicated density, with ($P_{computed}$) being the computed drive power, with ($\rho_e$) being the entrained phase density, and with the C1 and C2 terms comprising predetermined meter-specific constants.

In yet another aspect of the method, the method further comprises adding the density compensation factor to the measured two-phase density to provide a compensated two-phase density.

In yet another aspect of the method, the method further comprises adding the density compensation factor to the measured two-phase density to provide a compensated two-phase density, determining a predicted drive power using the liquid density, the entrained phase density, the compensated two-phase density, and a power characteristic of the vibratory flow meter, and determining an accuracy of flow measurements of the vibratory flow meter based on a difference between the predicted drive power value and the computed drive power.

In yet another aspect of the method, the method further comprises solving the equation, $$\left(\frac{\rho_l - \rho_{comp}}{\rho_l - \rho_e}\right),$$

where ($\rho_{comp}$) is the compensated two-phase density, to obtain a compensated volume fraction for the two-phase flow.

In yet another aspect of the method, determining the accuracy further comprises generating an alarm indication if the computed drive power differs from the predicted drive power by more than a predetermined tolerance.

In yet another aspect of the method, determining the accuracy further comprises generating an alarm indication if the computed drive power is greater than the predicted drive power by more than a predetermined upper threshold, indicating an excessive entrained phase level and further indicating a needed change in flow conditions in the vibratory flow meter.

In yet another aspect of the method, determining the accuracy further comprises generating an alarm indication if the computed drive power is greater than the predicted drive power by more than a predetermined upper threshold, indicating an excessive gas bubble size and further indicating a needed change in flow conditions in the vibratory flow meter.

In yet another aspect of the method, determining the accuracy further comprises generating an alarm indication if the computed drive power is greater than the predicted drive power by more than a predetermined upper threshold, indicating an excessive entrained solid phase level and further indicating a needed change in flow conditions in the vibratory flow meter.

In yet another aspect of the method, determining the accuracy further comprises generating an alarm indication if the computed drive power is greater than the predicted drive power by more than a predetermined upper threshold.

In yet another aspect of the method, determining the accuracy further comprises refining the compensated two-phase density if the computed drive power is less than the predicted drive power by more than a predetermined lower threshold or if the computed drive power is greater than the predicted drive power by more than a predetermined upper threshold.

In yet another aspect of the method, refining the compensated two-phase density comprises reducing the density compensation factor by an amount proportional to a difference between the computed drive power and the predetermined lower threshold.

In yet another aspect of the method, determining the accuracy further comprises comparing the predicted drive power to the computed drive power, generating an alarm indication if the computed drive power is greater than the predicted drive power by more than a predetermined upper threshold, and refining the compensated two-phase density by reducing the density compensation factor by an amount proportional to a difference between the computed drive power and the predetermined lower threshold if the computed drive power is less than the predicted drive power by more than a predetermined lower threshold.

DETAILED DESCRIPTION OF THE INVENTION

FIGS. 1-7 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
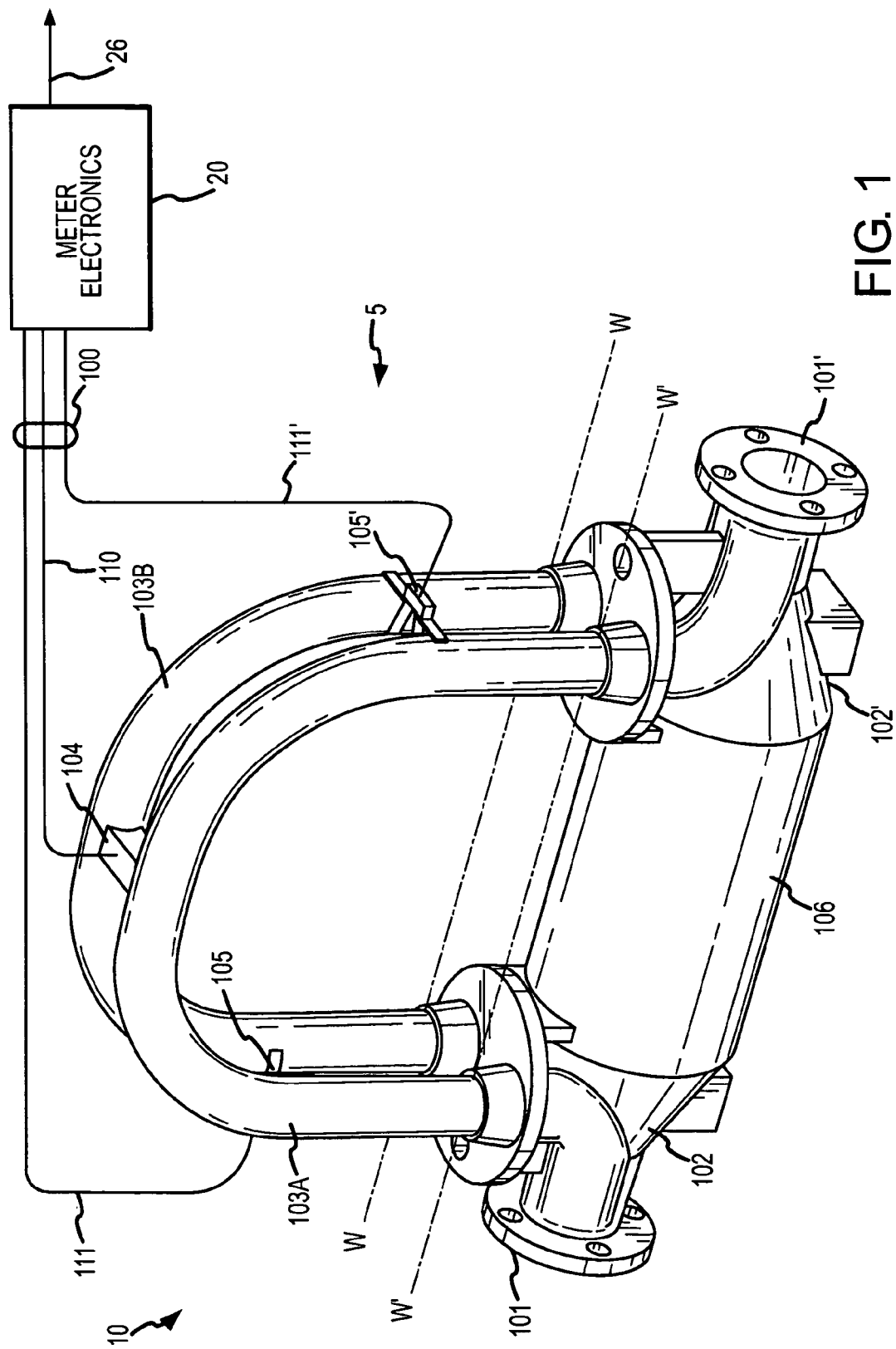
FIG. 1 shows a vibratory flow meter for correcting for an entrained phase in a two-phase flow of a flow material according to an embodiment of the invention.

FIG. 1 shows a vibratory flow meter 5 for correcting for an entrained phase in a two-phase flow of a flow material according to an embodiment of the invention. The entrained phase can comprise an entrained gas. The entrained phase can comprise an entrained solid. The discussion below centers on entrained gas. However, the discussion applies also to entrained solids.

The vibratory flow meter 5 comprises a flow meter assembly 10 and meter electronics 20. The meter electronics 20 is connected to the meter assembly 10 via leads 100 and is configured to provide measurements of one or more of a density, mass flow rate, volume flow rate, totalized mass flow, temperature, and other information over a communication path 26. It should be apparent to those skilled in the art that the present invention can be used in any type of Coriolis flow meter regardless of the number of drivers, pick-off sensors, flow conduits, or the operating mode of vibration. In addition, it should be recognized that the vibratory flow meter 5 can alternatively comprise a vibratory densitometer.

The flow meter assembly 10 includes a pair of flanges 101 and 101', manifolds 102 and 102', a driver 104, pick-off sensors 105 and 105', and flow conduits 103A and 103B. The driver 104 and the pick-off sensors 105 and 105' are connected to the flow conduits 103A and 103B.

The flanges 101 and 101' are affixed to the manifolds 102 and 102'. The manifolds 102 and 102' can be affixed to opposite ends of a spacer 106. The spacer 106 maintains the spacing between the manifolds 102 and 102' in order to prevent pipeline forces from being transmitted to flow conduits 103A and 103B. When the flow meter assembly 10 is inserted into a pipeline (not shown) which carries the flow material being measured, the flow material enters the flow meter assembly 10 through the flange 101, passes through the inlet manifold 102 where the total amount of flow material is directed to enter the flow conduits 103A and 103B, flows through the flow conduits 103A and 103B and back into the outlet manifold 102', where it exits the meter assembly 10 through the flange 101'.

The flow conduits 103A and 103B are selected and appropriately mounted to the inlet manifold 102 and to the outlet manifold 102' so as to have substantially the same mass distribution, moments of inertia, and elastic modules about the bending axes W- -W and W'- -W' respectively. The flow conduits 103A and 103B extend outwardly from the manifolds 102 and 102' in an essentially parallel fashion.

The flow conduits 103A and 103B are driven by the driver 104 in opposite directions about the respective bending axes W and W' and at what is termed the first out of phase bending mode of the vibratory flow meter 5. The driver 104 may comprise one of many well known arrangements, such as a magnet mounted to the flow conduit 103A and an opposing coil mounted to flow conduit 103B. An alternating current is passed through the opposing coil to cause both conduits to oscillate. A suitable drive signal is applied by the meter electronics 20 to the driver 104 via the lead 110.

The meter electronics 20 receives sensor signals on the leads 111 and 111', respectively. The meter electronics 20 produces a drive signal on the lead 110 which causes the driver 104 to oscillate the flow conduits 103A and 103B. The meter electronics 20 processes the left and right velocity signals from the pick-off sensors 105 and 105' in order to compute a mass flow rate. The communication path 26 provides an input and an output means that allows the meter electronics 20 to interface with an operator or with other electronic systems. The description of FIG. 1 is provided merely as an example of the operation of a Coriolis flow meter and is not intended to limit the teaching of the present invention.

The flow meter assembly 10 is configured to generate a vibrational response for the flow material. The meter electronics 20 can receive and process the vibrational response in order to generate one or more flow measurements of a flow material, including a two-phase flow. The two-phase flow can include entrained gas (including entrained air) or entrained solids. The vibratory flow meter 5 is configured to correct for the entrained gas and solids to produce reliable and accurate flow measurements despite the entrained phase. In some embodiments, the meter electronics 20 can receive and process the vibrational response in order to generate an alarm if an entrained phase level in the flow meter assembly 10 exceeds a predetermined level threshold (see FIG. 4 and the accompanying discussion). The alarm can indicate an excessive entrained phase level. The alarm can indicate an excessive bubble size, such as if the bubble size exceeds a predetermined size threshold, or gas volume. The alarm can indicate an excessive particle size or solid volume. The alarm can therefore indicate that the one or more flow measurements have exceeded a predetermined measurement tolerance. In some embodiments, the meter electronics 20 can refine the correction if the resulting flow measurement(s) are insufficiently accurate.

One common problem in generating the one or more flow measurements arises when there is entrained air (or any gas) in the flow material. The entrained air can be present as bubbles of varying size. When the bubbles are relatively small, they have negligible effect on the flow measurements. However, as the bubble size increases, the flow measurement error also increases.

The meter electronics 20 according to the some embodiments of the invention generates an improved flow measurement. The flow measurement is improved in the presence of an entrained phase in the flow material. The flow measurement is improved in the presence of entrained air bubbles in the flow material. The flow measurement is improved in the presence of an entrained solid in the flow material. For example, the meter electronics 20 can generate an improved density measurement for a flow material. The meter electronics 20 can additionally provide an entrained volume fraction and/or other flow rate measurements of the flow material. As a result, the vibratory flow meter 5 can comprise a vibrating densitometer and/or a Coriolis flow meter. Other additional flow measurements can be generated and are within the scope of the description and claims.

In one embodiment, the flowtubes 103A and 103B comprise substantially U-shaped flowtubes, as shown. Alternatively, in other embodiments, the flowtubes can comprise substantially straight flowtubes. However, other shapes can also be used, and are within the scope of the description and claims.

The meter electronics 20 in one embodiment is configured to vibrate the flowtubes 103A and 103B. The vibration is performed by the driver 104. The meter electronics 20 further receives resulting vibrational signals from the pickoff sensors 105 and 105'. The vibrational signals comprise a vibrational response of the flowtubes 103A and 103B. The meter electronics 20 processes the vibrational response and determines the one or more flow measurements.

Figure 2:
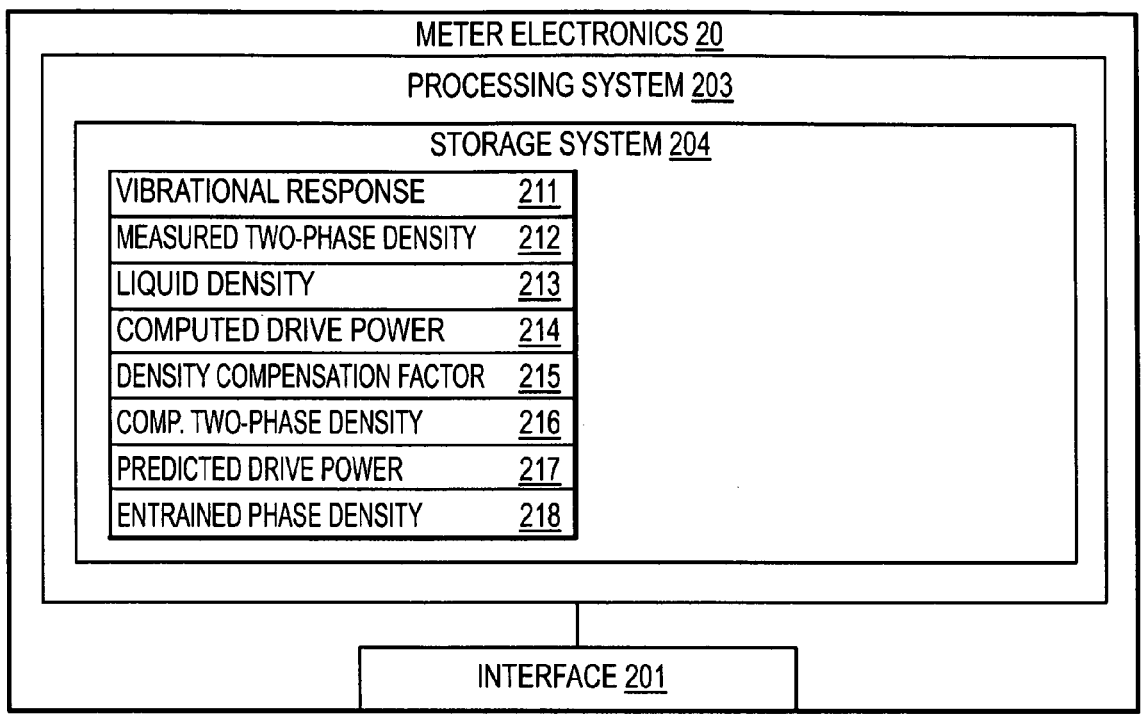
FIG. 2 shows the meter electronics of the vibratory flow meter according to an embodiment of the invention.

FIG. 2 shows the meter electronics 20 of the vibratory flow meter 5 according to an embodiment of the invention. The meter electronics 20 in this embodiment includes an interface 201 that can be coupled to the leads 100 (and optionally also to the communication path 26). The meter electronics 20 further includes a processing system 203. The processing system 203 can comprise any manner of processing system, including a general or specialized processor, circuitry, etc. The processing system 203 receives signals from the flow meter assembly 10 and processes the signals, such as a vibrational response from the pickoff sensors 105 and 105'. The processing system 203 further can generate and transfer signals to the flow meter assembly 10, such as a drive signal that powers the driver 104.

The meter electronics 20 can further include a storage system 204 that stores information. The storage system 204 can be integral to or separate from the processing system 203. The storage system 204 can store a vibrational response 211, a measured two-phase density 212, a liquid density 2132, a computed drive power 214, a density compensation factor 215, a compensated two-phase density 216, a predicted drive power 217, and an entrained phase density 218, for example. Other information can be stored in the storage system 204, including values discussed below.

The vibrational response 211 can comprise a vibrational response of the flow meter assembly 10. The vibrational response 211 can comprise pickoff signals that have been processed to obtain a flow measurement. The vibrational response 211 can consequently comprise a flow measurement, including one or more of a mass flow rate and a volume flow rate. The flow rate(s) can be stored as part of the vibrational response 211 or can be stored as separate values.

The measured two-phase density 212 comprises a density measurement obtained from the pickoff sensors 105 and 105'. The measured two-phase density 212 comprises a density measurement of a two-phase flow in the flow meter assembly 10, generated as is known in the art. As a result, as the amount of entrained air in the two-phase flow increases, the measured two-phase density 212 becomes less accurate.

The liquid density 213 comprises a known density of the liquid component of the two-phase flow. The liquid density 213 can comprise a stored value or constant, based on the liquid component.

The entrained phase density 218 comprises a known density ($\rho_e$) of the entrained second phase component of the two-phase flow. The entrained phase density 218 can comprise a stored value or constant, based on the entrained component.

The computed drive power 214 comprises an electrical power needed by the driver 104. The driver 104 may or may not receive all of the needed electrical power, depending on the amount of entrained air. The computed drive power 214 can comprise a calculated or measured value that is stored by the processing system 203. The computed drive power 214 can comprise the drive current multiplied by the drive voltage (i.e., the electrical current through the driver 104 multiplied by the electrical voltage at the driver). Alternatively, where the voltage at the driver 104 is not measured or otherwise known, the computed drive power 214 can comprise the drive current multiplied by the pickoff voltage at one of the pickoff sensors. However, this approach also has drawbacks, as the drive current is typically not unlimited and may not increase beyond a certain level even though it may be needed. Consequently, the computed drive power 214 can be calculated according to other values (see step 302 of FIG. 3 below).

The density compensation factor 215 comprises a compensation factor that will compensate the measured two-phase density 212 for the effects of an entrained phase, such as entrained gas, for example. However, the gas can vary and the density compensation factor 215 can compensate for any gas or gas mixture. The density compensation factor 215 accounts for the presence of entrained gas. The density compensation factor 215 accounts for varying levels of entrained gas.

The compensated two-phase density 216 comprises a density value for the two-phase flow. In some embodiments, the compensated two-phase density 216 comprises the measured two-phase density 212 combined with the density compensation factor 215.

The predicted drive power 217 comprises the drive power expected to be absorbed by the compensated two-phase density with an average bubble size or other expected fluid parameters, such as average viscosity, liquid density, etc. The predicted drive power 217 comprises a drive power calculated using the compensated two-phase density 216.

Figure 3:
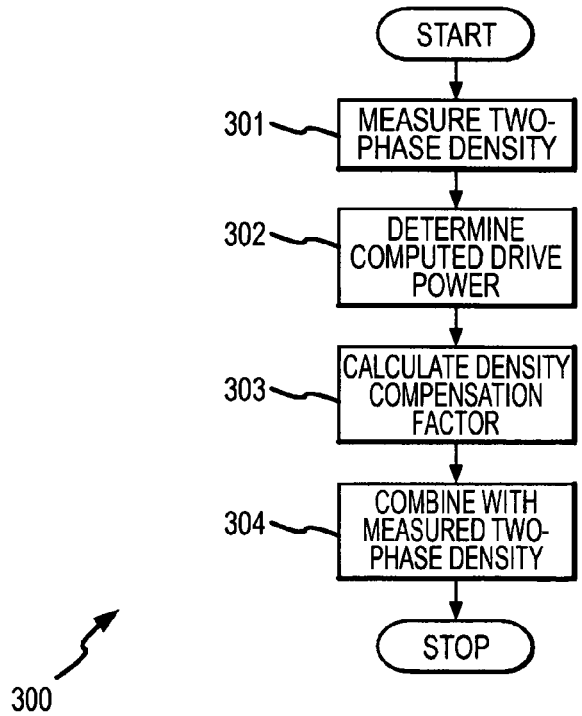
FIG. 3 is a flowchart of a method for correcting for an entrained phase in a two-phase flow of a flow material in a vibratory flow meter according to an embodiment of the invention.
Figure 4:
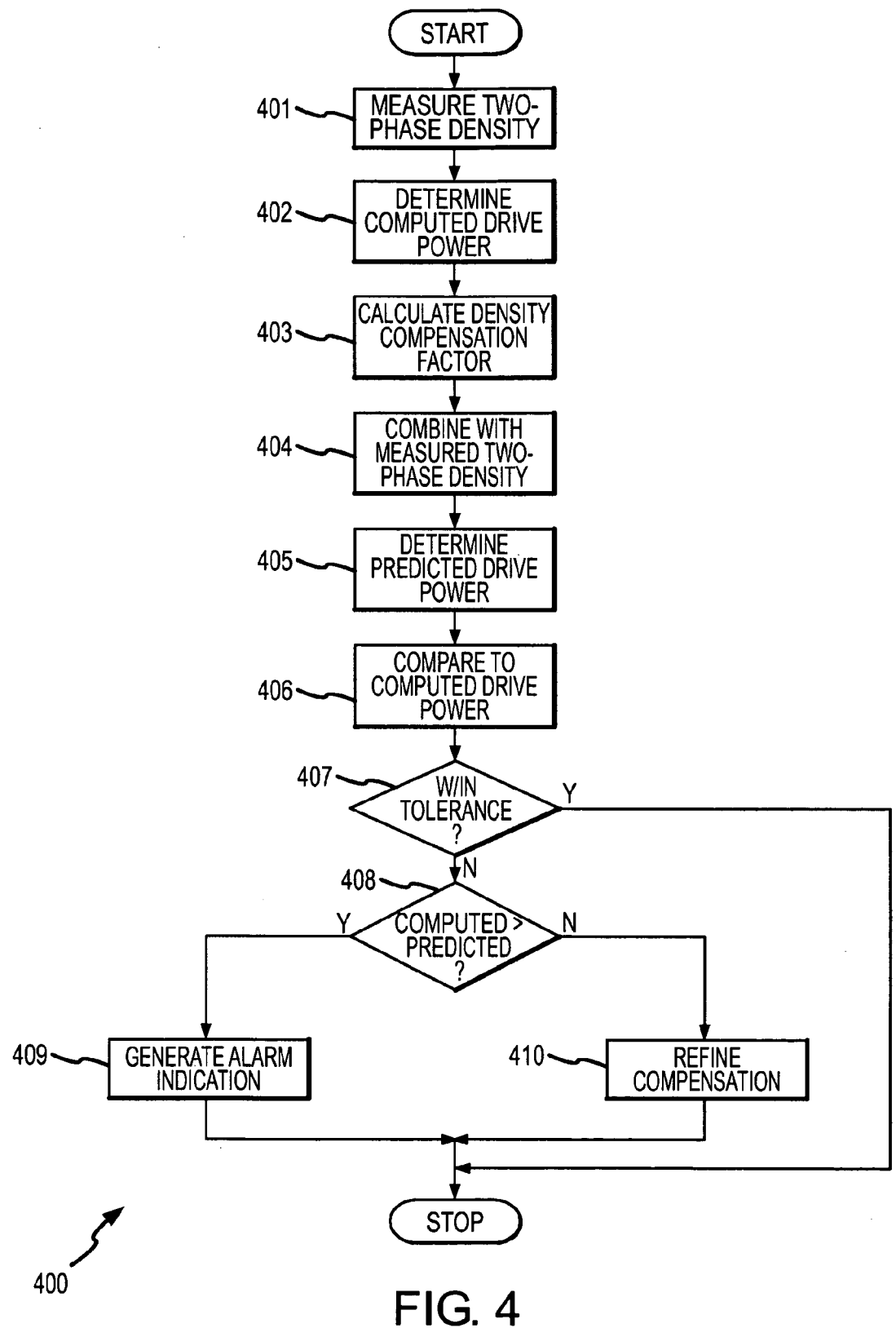
FIG. 4 is a flowchart of a method for correcting for an entrained phase in a two-phase flow of a flow material in a vibratory flow meter according to an embodiment of the invention.

In operation and according to one embodiment, the processing system 203 receives the vibrational response 211, generates a measured two-phase density 212 from the vibrational response, and corrects for the entrained phase in at least the density (see FIGS. 3-4 and the accompanying discussion).

FIG. 3 is a flowchart 300 of a method for correcting for an entrained phase in a two-phase flow of a flow material in a vibratory flow meter according to an embodiment of the invention. In step 301, the vibratory flow meter measures a density of the two-phase flow to obtain a measured two-phase density. As was previously discussed, the measured two-phase density can have a varying degree of error, depending on the entrained phase level, flow rate, and other parameters of the flow material.

In step 302, the computed drive power is determined. The computed drive power is the electrical power that is needed by the driver of the vibratory flow meter in order to vibrate the flow conduit(s). The computed drive power can be determined by multiplying the drive current by the drive voltage in one embodiment. Alternatively, the computed drive power can be determined by multiplying the drive current by a pickoff voltage present at one of the pickoff sensors. The pickoff sensor voltage can comprise an acceptable surrogate to the drive voltage, as the drive voltage is typically not measured or determined in a vibratory flow meter, whereas the pickoff sensor voltage is measured and known.

However, the power required to drive the flow conduit(s) is proportional to the square of the vibration amplitude. Therefore, when the target amplitude is doubled the power required to reach the target vibrational amplitude is quadrupled. Unfortunately, the drive current ($I_d$) will not exceed a current capability of an associated power supply and the driver may not necessarily receive the needed level of drive current in order to properly drive the flow conduit(s), especially when large entrained phase levels exist in the two-phase flow. Therefore, the computed drive power can comprise the power needed by the driver in order to fully vibrate the flow conduit(s), instead of the power being consumed by the driver. Consequently, the driver may need more power than is being supplied.

The computed drive power calculated according to this embodiment comprises the power needed to fully vibrate the flow conduit(s), even if the available electrical current is insufficient. The computed drive power is calculated according to the equation:

$$P_{computed} = K \times \left[ (I_d \times E_{PO}) \times \left(\frac{E_t}{E_{PO}}\right)^2 - (I_0 \times E_t) \right] \quad (1)$$

Where the (K) term is a proportionality constant for the vibratory flow meter, the ($I_d$) term is a measured drive current, the ($I_0$) term is the drive current for a volume fraction of zero (such as a calibration current), the ($E_{PO}$) is a measured pickoff voltage, and the ($E_t$) term is a pickoff target voltage. The solution of equation (1) determines the computed drive power due to the presence of the entrained phase.

The term ($I_d \times E_{PO}$) is a power term that is proportional to the total consumed drive power. Strictly speaking, the drive EMF voltage should be used to calculate drive power instead of the pickoff voltage ($E_{PO}$). However, the drive EMF is difficult to measure, while the easily measured pickoff voltage ($E_{PO}$) is proportional to the drive EMF. Therefore, the pickoff voltage ($E_{PO}$) can be employed in the equation. This product of the pickoff voltage ($E_{PO}$) and the drive current ($I_d$) is proportional to the power necessary to vibrate the flowtube(s). The pickoff target voltage ($E_t$) corresponds to a specified vibration amplitude target. The drive current ($I_d$) is normally regulated to hold the pickoff voltage at its target voltage and thus the vibration amplitude at its target amplitude. Entrained gas bubbles or entrained solids moving through a liquid, however, apply large damping forces to the vibrating flowtube(s) so that often the drive current limit is reached before the pickoff voltage ($E_{PO}$) reaches its target voltage ($E_t$). When this happens, the pickoff voltage ($E_{PO}$) is less than the target voltage ($E_t$) and the vibration amplitude is less than its target.

The amplitude ratio term, $$\left(\frac{E_t}{E_{PO}}\right)^2$$

adjusts the drive power for the reduction in vibration amplitude due to the drive current reaching its limit. In other words, the power calculated in equation (1) is the power that would be needed to maintain the vibration amplitude at its target, even though this power is not available. When the vibration amplitude is at its target then $E_{PO}=E_t$ and the voltage ratio term equals 1.

The final term in equation (1), the ($I_0 \times E_t$) term, is the zero-void-fraction power required to drive the flow meter without a second phase (gas or solid) present. This term can comprise a factory calibration power value. It is necessary to subtract the zero-void-fraction power from the total power because the pure liquid produces very little or no mass flow error. Equation (1) therefore computes the increase in power due to the entrained phase. This increase is roughly proportional with the error due to that phase. The zero volume fraction power can be determined during calibration at the factory.

In step 303, a density compensation factor is calculated. The density compensation factor can be calculated according to the equation:

$$\text{density compensation factor} = \left(\frac{\rho_l - \rho_{uut}}{\rho_l - \rho_e}\right)^{C1} \times C2(P_{computed}) \quad (2)$$

Where the ($\rho_{uut}$) term is the meter uncorrected (i.e., measured or indicated) density, the ($\rho_l$) is the known liquid density, the ($P_{computed}$) term is the computed drive power from equation (1). The uncorrected density ($\rho_{uut}$) is corrected by a function of uncorrected volume fraction, $$\left(\frac{\rho_l - \rho_{uut}}{\rho_l - \rho_e}\right),$$

where ($\rho_e$) is the entrained phase density. The constants (C1) and (C2) can be determined for a particular flow meter type. For one flow meter type, the constants were experimentally determined to be C1=0.66 and C2=0.0015. However, it should be understood that the two constants can vary according to the flow meter size, type, etc.

The density compensation equation (2) can be derived from the meter output parameters of computed drive power and indicated/measured volume fraction. It should be noted that the liquid density ($\rho_l$), and the entrained component density $\rho_e$ must be known in order to get the uncorrected volume fraction from the measured two-phase density. Note that if the entrained component is gas under low pressure, its density can be approximated as zero with little or no degradation in compensation. Also note that each meter type can require a unique compensation equation.

In step 304, the density compensation factor is combined with the measured two-phase density of step 301 in order to obtain a compensated two-phase density ($\rho_{comp}$). The compensated two-phase density more accurately reflects the density of the two-phase flow than the measured two-phase density. The compensated two-phase density minimizes the effect of entrained air on flow characteristic measurements. The compensated two-phase density minimizes the effect of larger bubbles on flow characteristic measurements.

FIG. 4 is a flowchart 400 of a method for correcting for an entrained phase in a two-phase flow of a flow material in a vibratory flow meter according to an embodiment of the invention. In step 401, the vibratory flow meter measures a density of the two-phase flow to obtain a measured two-phase density, as previously discussed.

In step 402, the computed drive power is determined, as previously discussed.

In step 403, a density compensation factor is calculated, as previously discussed.

In step 404, the density compensation factor is combined with the measured two-phase density of step 401 in order to obtain a compensated two-phase density, as previously discussed.

In step 405, a predicted drive power is determined. The predicted drive power uses the compensated two-phase density to generate a drive power prediction. The predicted drive power (Y) can be generated using the compensated two-phase density and according to the equation:

$$Y = [(C3)x^4 + (C4)x^3 - (C5)x^2 + (C6)x] \times (\rho_1 - \rho_e)^2 \quad (3)$$

Where x is the compensated gas volume fraction, $$\left( \frac{\rho_l - \rho_{comp}}{\rho_l - \rho_e} \right), \rho_{comp}$$

is the compensated density, and ($\rho_e$) is the entrained phase density.

Figure 5:
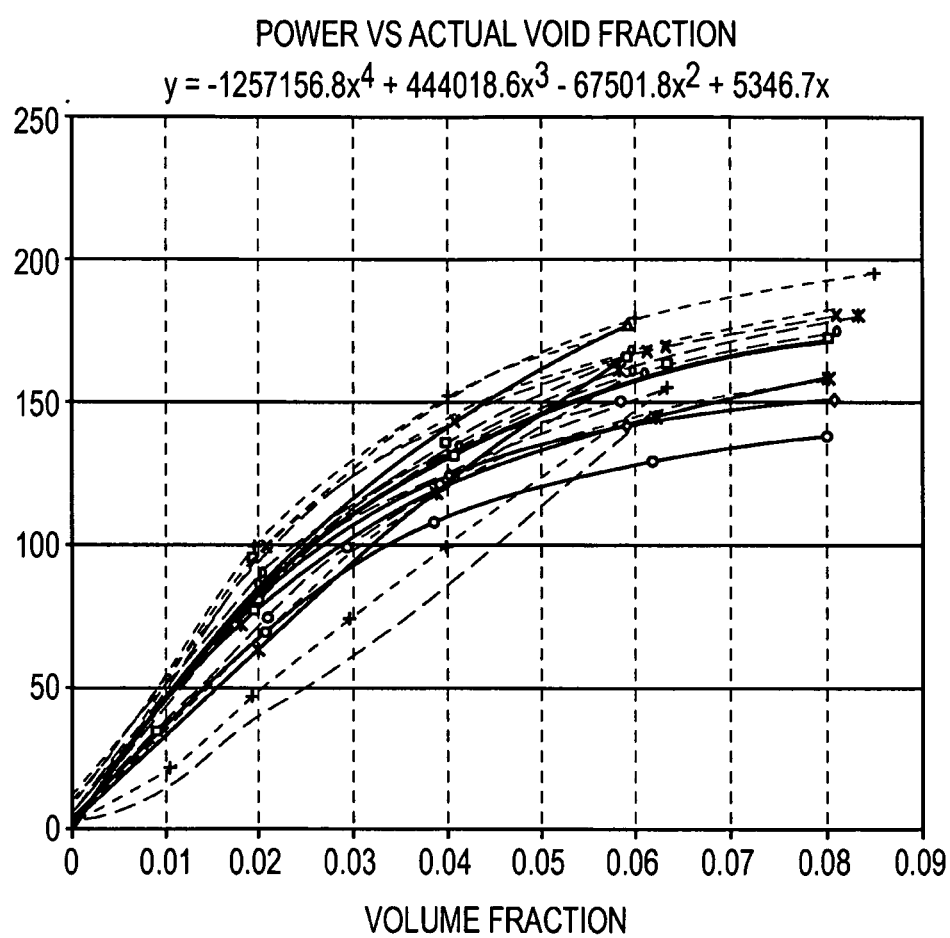
FIG. 5 is a graph of drive power versus gas volume fraction that has been determined experimentally for multiple fluid parameters and over a range of volume fractions.

FIG. 5 is a graph of drive power versus gas volume fraction that has been determined experimentally for multiple fluid parameters and over a range of volume fractions. The graph reflects equation (3) above. The graph/equation can be used to derive a predicted drive power based on the compensation that has already been performed. The lower lines in the graph are plots of actual computed drive power for several sizes of smaller gas bubbles and the upper lines are for several sizes of larger gas bubbles. It can be seen from the graph that larger gas bubbles require more drive power for the same gas void fraction. It can also be seen from the graph that a characteristic power curve can be experimentally determined for a particular flow meter model. The characteristic curve can be used to derive a predicted drive power, using a gas volume fraction value produced from the previous density compensation process.

The predicted drive power (the Y term in the graph) can be obtained through equation (3) by inserting a compensated volume fraction ($VF_{compensated}$) value (the x term in the graph). The compensated volume fraction can comprise a volume fraction of either a gas phase or a solid phase in relation to the liquid phase. The compensated volume fraction ($VF_{compensated}$) is represented as $$\left( \frac{\rho_l - \rho_{comp}}{\rho_l - \rho_e} \right).$$

Therefore, the equation (3) provides the predicted drive power (Y) using the density compensation factor in the form of the compensated volume fraction. In addition, the predicted drive power is derived using a power characteristic of the vibratory flow meter (i.e., the constants C3 through C6). The power characteristic can be stored in the meter electronics or can be externally provided. The power characteristic may need to be independently derived for each vibratory flow meter model.

Referring again to FIG. 4, in step 406 the predicted drive power is compared to the computed drive power. This is done in order to determine an accuracy of the flow measurements. If the computed drive power is within a predetermined tolerance of the predicted drive power, then the flow measurements can be determined to be acceptably accurate. If not, then an alarm indication can be generated.

The condition of large entrained gas bubbles and a low flow rate suffers from decoupling errors, but also from an error besides that of decoupling. This condition is called flow asymmetry and is a result of the response of bubbles to gravity. If the bubble rise velocity with respect to the fluid is comparable to the fluid velocity, then gas slows and accumulates in any downward flowing flow tube regions and races through any upward flowing flow tube regions. This asymmetry in the gas distribution results in a non-representative gas volume fraction in the meter and further results in excessive tube damping in the downward-flowing flow tube regions. As a result, compensation for decoupling under these conditions cannot be expected to eliminate the flow and density errors and these conditions need to be identified for either an output warning or further compensation.

For conditions of very small bubbles and higher flow rates, the flow asymmetry error decreases because the small bubbles tend to be carried with the fluid (high drag to buoyancy ratio). Ideally, this bubble type can be identified so as to be compensated differently.

A similar flow asymmetry condition exists for slurries. Large particles and low flow rates can result in particles settling in low spots in the meter. This causes non-representative solid volume fraction in the meter, excessive damping, and flow and density errors that cannot be compensated. This asymmetry condition also needs to be identified and a warning needs to be output.

In step 407, if the computed drive power is within a predetermined tolerance amount of the predicted drive power, then the compensated density measurement is deemed to be accurate and compensation goes no further. Otherwise, the flow measurements have become unacceptably inaccurate. Consequently, the method proceeds to step 408.

In step 408, if the computed drive power exceeds the predicted drive power by more than the predetermined upper threshold, then the method branches to step 409. Otherwise, where the computed drive power is less than the predicted drive power by more than the predetermined lower threshold, then the method branches to step 410.

Figure 6:
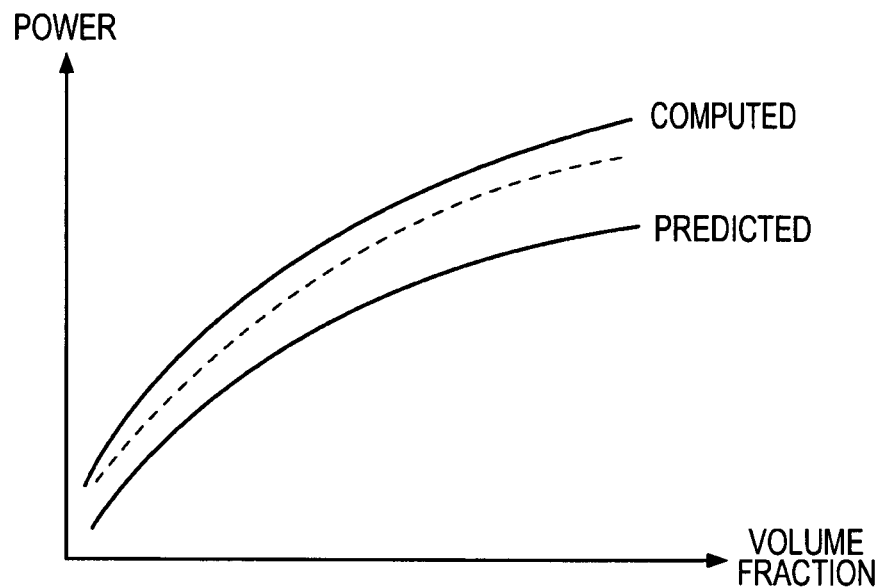
FIG. 6 is a graph showing the computed drive power and the predicted drive power versus the volume fraction of the entrained phase.

FIG. 6 is a graph showing the computed drive power and the predicted drive power versus the volume fraction of the entrained phase. In FIG. 6, the computed drive power is shown as being greater than the predicted drive power. The predicted drive power is the power required for nominal entrained bubble size, fluid viscosity, and other parameters such as flow rate. The density compensation factor is likewise determined for nominal fluid mixture parameters. Thus, if the computed drive power is different from the predicted drive power, then the compensated density differs from the true density of the two-phase mixture. For instance, conditions such as large bubble size and low viscosity consume more power than the predicted power and also produce more error than the compensation factor corrects. Correlation between power and density error exists because the same mechanism that dissipates vibration energy, fluid decoupling, produces density error. The difference between predicted power and computed power thus serves as a check of the accuracy of the compensation. In this example, the computed drive power is greater than the predicted drive power by more than a predetermined upper threshold (dashed line). Consequently, the compensated density measurements can be considered to be unacceptably inaccurate. When this occurs, an alarm can be triggered signifying that the flow conditions need to be changed, such as by mixing the flow or increasing a flow rate or pressure. Also, up to the upper threshold, the compensation factor equation can be altered for the higher decoupling condition.

Figure 7:
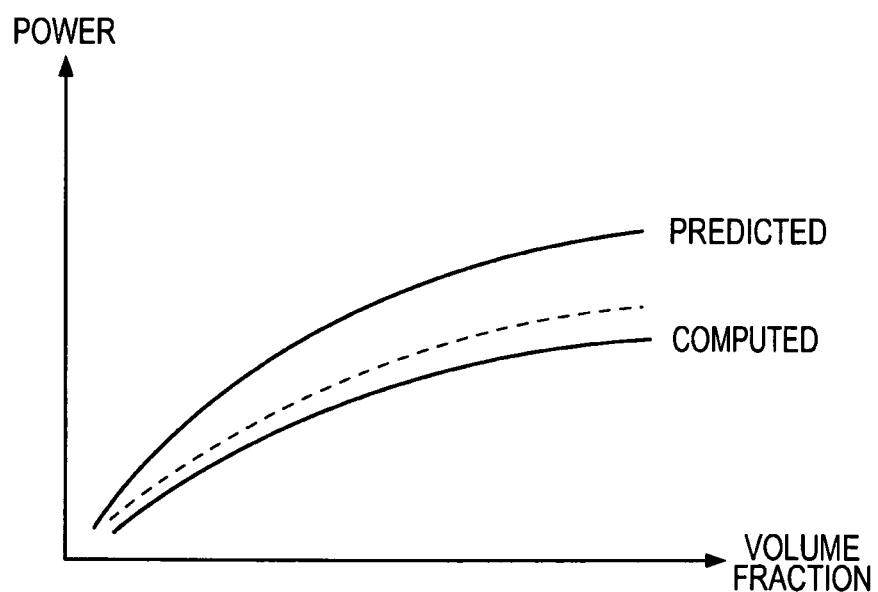
FIG. 7 is a graph of the computed drive power and the predicted drive power similar to FIG. 6 except that the computer drive power is shown as being less than the predicted drive power.

FIG. 7 is a graph of the computed drive power and the predicted drive power similar to FIG. 6 except that the computed drive power is shown as being less than the predicted drive power. This condition exists when the amount of fluid decoupling is less than for the nominal conditions used to determine the predicted power. In this example, the computed drive power is less than the predicted drive power by more than a predetermined lower threshold (dashed line). Therefore, the compensated two-phase density is not yet sufficiently accurate. Consequently, the compensation factor equation can be refined to reflect the lower amount of decoupling. The modified compensation factor produces a more accurate compensated two-phase density and causes the computed drive power to more closely track the predicted drive power.

Referring again to FIG. 4, in step 409, if the computed drive power is greater than the predicted drive power by more than the predetermined upper threshold, then an alarm indication is generated. The alarm indication can be generated in order to warn an operator that adverse flow conditions are occurring. The alarm indication can be generated in order to warn that the flow measurements have become unreliable. The alarm indication can be generated in order to warn of an excessive entrained phase level, such as excessive solids or excessive solid particle size, or an excessive bubble size in the case of an entrained gas. In addition, the alarm indication can be generated in order to prompt a change in flow conditions. For example, the alarm indication can prompt a change in flow rate, flow pressure, or other flow conditions. The alarm condition can be stored and/or transferred in some embodiments, such as transferred to an operator or technician who can change the flow conditions.

In step 410, if the computed drive power is less than the predicted drive power, then the compensated two-phase density can be refined in order to improve the accuracy and reliability of the flow measurements. In some embodiments, the compensated two-phase density is refined by reducing the density compensation factor. In some embodiments, the density compensation factor is reduced by an amount proportional to a difference between the computed drive power and the predetermined lower threshold.

What is claimed is:

1. A vibratory flow meter (100) for correcting for an entrained phase in a two-phase flow of a flow material, comprising a flow meter assembly (10) including a driver (104) and with the vibratory flow meter (100) being configured to generate a vibrational response for the flow material and further comprising meter electronics (20) coupled to the flow meter assembly (10) and receiving the vibrational response, with the vibratory flow meter (100) being characterized by:
the meter electronics (20) being configured to generate a measured two-phase density of the two-phase flow using the vibrational response, determine the computed drive power needed by a driver (104) of the flow meter assembly (10), calculate a density compensation factor using a liquid density of a liquid component of the two-phase flow, an entrained phase density of an entrained component, the measured two-phase density, and the computed drive power, and combine the density compensation factor with the measured two-phase density to provide a compensated two-phase density.

2. The vibratory flow meter (100) of claim 1, with the meter electronics (20) being configured to multiply a drive voltage by a drive current in order to determine the computed drive power.

3. The vibratory flow meter (100) of claim 1, with the meter electronics (20) being configured to multiply a pickoff sensor voltage by a drive current in order to determine the computed drive power.

4. The vibratory flow meter (100) of claim 1, with the meter electronics (20) being configured to solve equation $$P_{computed} = K \times \left[ (I_d \times E_{PO}) \times \left(\frac{E_t}{E_{PO}}\right)^2 - (I_0 \times E_t) \right]$$

in order to determine the computed drive power, where K is a proportionality constant, $I_d$ is a measured drive current, $I_0$ is a zero volume fraction drive current, $E_{PO}$ is a pickoff voltage, and $E_t$ is a pickoff target voltage.

5. The vibratory flow meter (100) of claim 1, with calculating the density compensation factor comprising solving equation $$\left(\left(\frac{\rho_l - \rho_{uut}}{\rho_l - \rho_e}\right)^{C1} \times C2(P_{computed})\right),$$

with ($\rho_l$) being the liquid density, with ($\rho_e$) being the entrained phase density, with ($\rho_{uut}$) being the measured two-phase density, with ($P_{computed}$) being the computed drive power, and with the C1 and C2 terms comprising predetermined meter-specific constants.

6. The vibratory flow meter (100) of claim 1, with the meter electronics (20) being further configured to determine a predicted drive power using the liquid density, the entrained phase density, the compensated two-phase density, and a power characteristic of the vibratory flow meter (100), and determine an accuracy of flow measurements of the vibratory flow meter (100) based on a difference between the predicted drive power value and the computed drive power.

7. The vibratory flow meter (100) of claim 6, with the meter electronics (20) being further configured to solve the equation, $$\left(\frac{\rho_l - \rho_{comp}}{\rho_l - \rho_e}\right),$$

where ($\rho_{comp}$) is the compensated two-phase density, to obtain a compensated volume fraction for the two-phase flow.

8. The vibratory flow meter (100) of claim 6, with determining the accuracy further comprising generating an alarm indication if the computed drive power differs from the predicted drive power by more than a predetermined tolerance.

9. The vibratory flow meter (100) of claim 6, with determining the accuracy further comprising generating an alarm indication if the computed drive power is greater than the predicted drive power by more than a predetermined upper threshold, indicating an excessive entrained phase level and further indicating a needed change in flow conditions in the vibratory flow meter.

10. The vibratory flow meter (100) of claim 6, with determining the accuracy further comprising generating an alarm indication if the computed drive power is greater than the predicted drive power by more than a predetermined upper threshold, indicating an excessive gas bubble size and further indicating a needed change in flow conditions in the vibratory flow meter.

11. The vibratory flow meter (100) of claim 6, with determining the accuracy further comprising generating an alarm indication if the computed drive power is greater than the predicted drive power by more than a predetermined upper threshold, indicating an excessive solid entrained phase level and further indicating a needed change in flow conditions in the vibratory flow meter.

12. The vibratory flow meter (100) of claim 6, with determining the accuracy further comprising generating an alarm indication if the computed drive power is greater than the predicted drive power by more than a predetermined upper threshold.

13. The vibratory flow meter (100) of claim 6, with determining the accuracy further comprising refining the compensated two-phase density if the computed drive power is less than the predicted drive power by more than a predetermined lower threshold or if the computed drive power is greater than the predicted drive power by more than a predetermined upper threshold.

14. The vibratory flow meter (100) of claim 13, with refining the compensated two-phase density comprising reducing the density compensation factor by an amount proportional to a difference between the computed drive power and the predetermined lower threshold.

15. The vibratory flow meter (100) of claim 6, with determining the accuracy further comprising comparing the predicted drive power to the computed drive power, generating an alarm indication if the computed drive power is greater than the predicted drive power by more than a predetermined upper threshold, and refining the compensated two-phase density by reducing the density compensation factor by an amount proportional to a difference between the computed drive power and the predetermined lower threshold if the computed drive power is less than the predicted drive power by more than a predetermined lower threshold.

16. A method of correcting for an entrained phase in a two-phase flow of a flow material in a vibratory flow meter, the method comprising generating a measured two-phase density of the two-phase flow, with the method being characterized by:
    determining a computed drive power needed by a driver of the vibratory flow meter;
    calculating a density compensation factor using a liquid density of a liquid component of the two-phase flow, an entrained phase density of an entrained component, the measured two-phase density, and the computed drive power; and
    combining the density compensation factor with the measured two-phase density to provide a compensated two-phase density.

17. The method of claim 16, with determining the computed drive power comprising multiplying a drive voltage by a drive current.

18. The method of claim 16, with determining the computed drive power comprising multiplying a pickoff sensor voltage by a drive current.

19. The method of claim 16, with determining the computed drive power comprising solving equation $$P_{computed} = K \times \left[ (I_d \times E_{PO}) \times \left(\frac{E_t}{E_{PO}}\right)^2 - (I_0 \times E_t) \right],$$

where K is a proportionality constant, $I_d$ is a measured drive current, $I_0$ is a zero volume fraction drive current, $E_{PO}$ is a pickoff voltage, and $E_t$ is a pickoff target voltage.

20. The method of claim 16, with calculating the density compensation factor comprising solving equation $$\left(\frac{\rho_l - \rho_{uut}}{\rho_l - \rho_e}\right)^{C1} \times C2(P_{computed}),$$

with ($\rho_l$) being the liquid density, with ($\rho_{uut}$) being the measured two-phase density, with ($\rho_e$) being the entrained phase density, with ($P_{computed}$) being the computed drive power, and with the C1 and C2 terms comprising predetermined meter-specific constants.

21. The method of claim 16, further comprising:
    determining a predicted drive power using the liquid density, the entrained phase density, the compensated two-phase density, and a power characteristic of the vibratory flow meter; and
    determining an accuracy of flow measurements of the vibratory flow meter based on a difference between the predicted drive power value and the computed drive power.

22. The method of claim 21, further comprising solving the equation, $$\left(\frac{\rho_l - \rho_{comp}}{\rho_l - \rho_e}\right),$$

where ($\rho_{comp}$) is the compensated two-phase density, to obtain a compensated volume fraction for the two-phase flow.

23. The method of claim 21, with determining the accuracy further comprising generating an alarm indication if the computed drive power differs from the predicted drive power by more than a predetermined tolerance.

24. The method of claim 21, with determining the accuracy further comprising generating an alarm indication if the computed drive power is greater than the predicted drive power by more than a predetermined upper threshold, indicating an excessive entrained phase level and further indicating a needed change in flow conditions in the vibratory flow meter.

25. The method of claim 21, with determining the accuracy further comprising generating an alarm indication if the computed drive power is greater than the predicted drive power by more than a predetermined upper threshold, indicating an excessive gas bubble size and further indicating a needed change in flow conditions in the vibratory flow meter.

26. The method of claim 21, with determining the accuracy further comprising generating an alarm indication if the computed drive power is greater than the predicted drive power by more than a predetermined upper threshold, indicating an excessive solid entrained phase level and further indicating a needed change in flow conditions in the vibratory flow meter.

27. The method of claim 21, with determining the accuracy further comprising generating an alarm indication if the computed drive power is greater than the predicted drive power by more than a predetermined upper threshold.

28. The method of claim 21, with determining the accuracy further comprising refining the compensated two-phase density if the computed drive power is less than the predicted drive power by more than a predetermined lower threshold or if the computed drive power is greater than the predicted drive power by more than a predetermined upper threshold.

29. The method of claim 28, with refining the compensated two-phase density comprising reducing the density compensation factor by an amount proportional to a difference between the computed drive power and the predetermined lower threshold.

30. The method of claim 21, with determining the accuracy further comprising:
   comparing the predicted drive power to the computed drive power;
   generating an alarm indication if the computed drive power exceeds the predicted drive power by more than a predetermined upper threshold; and
   refining the compensated two-phase density by reducing the density compensation factor by an amount proportional to a difference between the computed drive power and the predetermined lower threshold if the computed drive power is less than the predicted drive power by more than a predetermined lower threshold.

31. A method of correcting for an entrained phase in a two-phase flow of a flow material in a vibratory flow meter, the method comprising generating a measured two-phase density of the two-phase flow, with the method being characterized by:
   determining the computed drive power needed by a driver of the vibratory flow meter;
   calculating a density compensation factor using a liquid density of a liquid component of the two-phase flow, an entrained phase density of an entrained component, the measured two-phase density, and the computed drive power;
   combining the density compensation factor with the measured two-phase density to provide a compensated two-phase density;
   determining a predicted drive power using the liquid density, the entrained phase density, the compensated two-phase density, and a power characteristic of the vibratory flow meter; and
   determining an accuracy of flow measurements of the vibratory flow meter based on a difference between the predicted drive power value and the computed drive power.

32. The method of claim 31, with determining the computed drive power comprising multiplying a drive voltage by a drive current.

33. The method of claim 31, with determining the computed drive power comprising multiplying a pickoff sensor voltage by a drive current.

34. The method of claim 31, with determining the computed drive power comprising solving equation $$P_{computed} = K \times \left[ (I_d \times E_{PO}) \times \left(\frac{E_t}{E_{PO}}\right)^2 - (I_0 \times E_t) \right],$$

where K is a proportionality constant, $I_d$ is a measured drive current, $I_0$ is a zero volume fraction drive current, $E_{PO}$ is a pickoff voltage, and $E_t$ is a pickoff target voltage.

35. The method of claim 31, with calculating the density compensation factor comprising solving equation $$\left(\frac{\rho_l - \rho_{uut}}{\rho_l - \rho_e}\right)^{C1} \times C2(P_{computed}),$$

with $(\rho_l)$ being the liquid density, with $(\rho_e)$ being the entrained phase density, with $(\rho_{uut})$ being the measured two-phase density, with $(P_{computed})$ being the computed drive power, and with the C1 and C2 terms comprising predetermined meter-specific constants.

36. The method of claim 31, further comprising solving the equation, $$\left(\frac{\rho_l - \rho_{comp}}{\rho_l - \rho_e}\right),$$

where $(\rho_{comp})$ is the compensated two-phase density, to obtain a compensated volume fraction for the two-phase flow.

37. The method of claim 31, with determining the accuracy further comprising generating an alarm indication if the computed drive power differs from the predicted drive power by more than a predetermined tolerance.

38. The method of claim 31, with determining the accuracy further comprising generating an alarm indication if the computed drive power is greater than the predicted drive power by more than a predetermined upper threshold, indicating an excessive entrained phase level and further indicating a needed change in flow conditions in the vibratory flow meter.

39. The method of claim 31, with determining the accuracy further comprising generating an alarm indication if the computed drive power is greater than the predicted drive power by more than a predetermined upper threshold, indicating an excessive gas bubble size and further indicating a needed change in flow conditions in the vibratory flow meter.

40. The method of claim 31, with determining the accuracy further comprising generating an alarm indication if the computed drive power is greater than the predicted drive power by more than a predetermined upper threshold, indicating an excessive solid entrained phase level and further indicating a needed change in flow conditions in the vibratory flow meter.

41. The method of claim 31, with determining the accuracy further comprising generating an alarm indication if the computed drive power is greater than the predicted drive power by more than a predetermined upper threshold.

42. The method of claim 31, with determining the accuracy further comprising refining the compensated two-phase density if the computed drive power is less than the predicted drive power by more than a predetermined lower threshold or if the computed drive power is greater than the predicted drive power by more than a predetermined upper threshold.

43. The method of claim 42, with refining the compensated two-phase density comprising reducing the density compensation factor by an amount proportional to a difference between the computed drive power and the predetermined lower threshold.

44. The method of claim 31, with determining the accuracy further comprising:
   comparing the predicted drive power to the computed drive power;
   generating an alarm indication if the computed drive power is greater than the predicted drive power by more than a predetermined upper threshold; and refining the compensated two-phase density by reducing the density compensation factor by an amount proportional to a difference between the computed drive power and the predetermined lower threshold if the computed drive power is less than the predicted drive power by more than a predetermined lower threshold.

* * * * *